US012679548B2

(12) United States Patent
Tomes et al.

(10) Patent No.: US 12,679,548 B2
(45) Date of Patent: Jul. 14, 2026

(54) AIRCRAFT PROPULSION SYSTEM AND METHOD FOR OPERATING SAME

(71) Applicant: Pratt & Whitney Canada Corp., Longueuil (CA)

(72) Inventors: Nathan Tomes, Hamilton (CA); Michel Bousquet, Longueuil (CA); Mathias Michaud, Drummondville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 95 days.

(21) Appl. No.: 18/587,100

(22) Filed: Feb. 26, 2024

(65) Prior Publication Data

US 2025/0269971 A1    Aug. 28, 2025

(51) Int. Cl.
|   |   |
|---|---|
| *F02C 6/12* | (2006.01) |
| *B64C 27/08* | (2023.01) |
| *B64D 27/02* | (2006.01) |
| *F02K 5/02* | (2006.01) |

(52) U.S. Cl.
CPC ............ *B64D 27/026* (2024.01); *B64C 27/08* (2013.01); *F02C 6/12* (2013.01); *F02K 5/02* (2013.01)

(58) Field of Classification Search
CPC ............ F02C 6/12; F02K 5/02; B64D 27/026
See application file for complete search history.

(56) References Cited

U.S. PATENT DOCUMENTS

| | | | |
|---|---|---|---|
| 2,620,621 A | 12/1952 | Nettel | |
| 3,163,984 A * | 1/1965 | Dumont ................. | F02B 37/11 60/611 |
| 3,423,927 A * | 1/1969 | Scherenberg ........... | F02B 37/11 60/606 |
| 3,513,929 A * | 5/1970 | Kim ...................... | F02B 37/166 60/407 |
| 3,676,999 A * | 7/1972 | Oldfield ................ | F02B 37/166 60/599 |
| 3,961,199 A * | 6/1976 | Bronicki ............... | F02B 37/025 123/179.14 |

(Continued)

OTHER PUBLICATIONS

EP Search Report for EP Patent Application No. 25160045.8 dated Jul. 9, 2025.

*Primary Examiner* — Jonathan R Matthias
(74) *Attorney, Agent, or Firm* — Getz Balich LLC

(57) ABSTRACT

A propulsion system for an aircraft includes an engine assembly, an interburner, a turbocompressor, and a flow control assembly. The engine assembly includes an engine. The engine includes an air inlet, an exhaust outlet, and an engine output shaft. The interburner includes an interburner inlet and an interburner outlet. The turbocompressor assembly includes at least one turbocompressor. The at least one turbocompressor includes a turbine and a compressor. The turbine includes a turbine inlet and a turbine outlet. The compressor includes a compressor inlet and a compressor outlet. The flow control assembly includes an engine exhaust diverter subassembly and at least one compressor outlet diverter subassembly. The engine exhaust diverter subassembly is connected to exhaust outlet, the interburner inlet, and the turbine inlet. The at least one compressor outlet diverter subassembly is connected to the compressor outlet, the air inlet, and the interburner inlet.

20 Claims, 12 Drawing Sheets

(56) References Cited

U.S. PATENT DOCUMENTS

| | | | | |
|---|---|---|---|---|
| 4,160,365 A | * | 7/1979 | Petrov | F02B 37/166 |
| | | | | 60/606 |
| 8,141,360 B1 | * | 3/2012 | Huber | F01K 23/065 |
| | | | | 290/40 B |
| 9,677,466 B2 | | 6/2017 | Smaoui | |
| 11,827,370 B1 | | 11/2023 | Freer | |
| 2014/0360362 A1 | * | 12/2014 | Peters | F01N 3/037 |
| | | | | 55/338.1 |
| 2023/0085551 A1 | | 3/2023 | Dussault | |
| 2024/0010346 A1 | * | 1/2024 | Smith | B64D 27/32 |

* cited by examiner

AIRCRAFT PROPULSION SYSTEM AND METHOD FOR OPERATING SAME

TECHNICAL FIELD

This disclosure relates to a propulsion system for an aircraft.

BACKGROUND OF THE ART

A propulsion system for an aircraft may be configured, for example, with an engine assembly configured to drive rotation of a propulsor for the aircraft. Various configurations of such aircraft propulsion systems are known in the art. While these known aircraft propulsion systems may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes an engine assembly, an interburner, a turbocompressor, and a flow control assembly. The engine assembly includes an engine. The engine includes an air inlet, an exhaust outlet, and an engine output shaft. The engine output shaft is configured to be operably connected to a propulsor of the aircraft. The engine is configured to drive rotation of the propulsor with the engine output shaft. The interburner includes an interburner inlet and an interburner outlet. The interburner is configured to mix and burn a gas from the interburner inlet with fuel to form a combustion gas. The turbocompressor assembly includes at least one turbocompressor. The at least one turbocompressor includes a turbine and a compressor. The turbine includes a turbine inlet and a turbine outlet. The compressor includes a compressor inlet and a compressor outlet. The turbine and the compressor form a rotational assembly. The rotational assembly includes a shaft, a bladed turbine rotor of the turbine, and a bladed compressor rotor of the compressor. The shaft interconnects the bladed turbine rotor and the bladed compressor rotor. The flow control assembly includes an engine exhaust diverter subassembly and at least one compressor outlet diverter subassembly. The engine exhaust diverter subassembly is connected in fluid communication with and between the exhaust outlet, the interburner inlet, and the turbine inlet. The at least one compressor outlet diverter subassembly is connected in fluid communication with and between the compressor outlet, the air inlet, and the interburner inlet.

In any of the aspects or embodiments described above and herein, the engine exhaust diverter subassembly may be selectively configurable in a first condition, a second condition, and a closed condition. In the first condition, the engine exhaust diverter subassembly may connect the exhaust outlet in fluid communication with the interburner inlet. In the second condition, the engine exhaust diverter subassembly may connect the exhaust outlet in fluid communication with the turbine inlet. In the closed condition, the engine exhaust diverter subassembly may isolate the exhaust outlet from the interburner inlet and the turbine inlet.

In any of the aspects or embodiments described above and herein, the at least one compressor outlet diverter subassembly may be selectively configurable in a first condition, a second condition, and a closed condition. In the first condition, the at least one compressor outlet diverter subassembly may connect the compressor outlet in fluid communication with the air inlet. In the second condition, the at least one compressor outlet diverter subassembly may connect the compressor outlet in fluid communication with the interburner inlet. In the closed condition, the at least one compressor outlet diverter subassembly may isolate the compressor outlet from the air inlet and the interburner inlet.

In any of the aspects or embodiments described above and herein, the engine assembly may further include an intercooler. The intercooler may be connected in fluid communication with and between the compressor outlet diverter subassembly.

In any of the aspects or embodiments described above and herein, the intercooler may include a particle separator.

In any of the aspects or embodiments described above and herein, the propulsion system may further include an electrical assembly including at least one electric generator. The at least one electric generator may be operably connected to the rotational assembly of one or more turbocompressors of the at least one turbocompressor.

In any of the aspects or embodiments described above and herein, the turbocompressor assembly may further includes a first gearbox. The first gearbox may be operably connected to and between the at least one generator and the rotational assembly of the one or more turbocompressors of the at least one turbocompressor.

In any of the aspects or embodiments described above and herein, the engine assembly may further include a second gearbox. The electrical assembly may include a first electric motor electrically connected to the at least one electric generator. The engine output shaft and the first electric motor may be operably connected to the second gearbox.

In any of the aspects or embodiments described above and herein, the electrical assembly may further include an energy storage device electrically connected to the at least one electric generator and the first electric motor.

In any of the aspects or embodiments described above and herein, the engine output shaft may be operably connected to the second gearbox by a one-way clutch.

In any of the aspects or embodiments described above and herein, the at least one turbocompressor may include a first turbocompressor and a second turbocompressor, the at least one compressor outlet diverter subassembly may include a first compressor outlet diverter subassembly and a second compressor outlet diverter subassembly, the first compressor outlet diverter subassembly is connected in fluid communication with and between the compressor outlet of the compressor of the first turbocompressor, the air inlet, and the interburner inlet, and the second compressor outlet diverter subassembly is connected in fluid communication with and between the compressor outlet of the compressor of the second turbocompressor, the air inlet, and the interburner inlet.

In any of the aspects or embodiments described above and herein, the propulsion system may further include an electrical assembly including a first electric generator and a second electric generator. The first electric generator may be operably connected to the rotational assembly of the first turbocompressor and the second electric generator may be operably connected to the rotational assembly of the second turbocompressor.

In any of the aspects or embodiments described above and herein, the engine may be an intermittent combustion engine.

According to another aspect of the present disclosure, a method for operating a propulsion system for an aircraft includes driving rotation of a propulsor of the aircraft with an engine of an engine assembly and directing a combustion gas from an exhaust outlet of the engine to a turbine of at least one turbocompressor of a turbocompressor assembly with an engine exhaust diverter subassembly of a flow control assembly. The engine exhaust diverter subassembly is connected in fluid communication with and between the engine, an interburner, and the turbine. The method further includes directing a compressed air from a compressor of the at least one turbocompressor to the engine with at least one compressor outlet diverter subassembly of the flow control assembly. The at least one compressor outlet diverter subassembly is connected in fluid communication with and between the compressor, an air inlet of the engine, and the interburner.

In any of the aspects or embodiments described above and herein, directing the combustion gas from the exhaust outlet to the turbine may include directing the combustion gas from the exhaust outlet to the interburner with the engine exhaust diverter subassembly, mixing and burning the combustion gas with fuel in the interburner, and directing the combustion gas from the interburner to the turbine.

In any of the aspects or embodiments described above and herein, directing the combustion gas from the exhaust outlet to the turbine may include directing the combustion gas from the exhaust outlet directly to the turbine with the engine exhaust diverter subassembly.

In any of the aspects or embodiments described above and herein, the method may further include identifying a failure of the engine and configuring the propulsion system in a failed engine operating mode, in response to identifying the failure of the engine, by: isolating the exhaust outlet from the interburner and the turbine with the engine exhaust diverter subassembly, directing the compressed air from the compressor to the interburner, with the at least one compressor outlet diverter subassembly, mixing and burning the compressed air with fuel in the interburner, and directing the combustion gas from the interburner to the turbine, and decoupling the engine from the propulsor with a clutch.

In any of the aspects or embodiments described above and herein, the at least one turbocompressor may include a first turbocompressor and a second turbocompressor. The method may further include identifying a failure of the second turbocompressor and configuring the propulsion system in a failed turbocompressor operating mode, in response to identifying the failure of the turbocompressor, by: isolating the compressor of the second turbocompressor from the air inlet and the interburner with the at least one compressor outlet diverter subassembly and isolating the turbine of the second turbocompressor from the exhaust outlet and the interburner with a control valve in fluid communication with and between the interburner and the turbine of the second turbocompressor and with the exhaust diverter subassembly.

In any of the aspects or embodiments described above and herein, the method may further include generating electrical power with an electric generator of an electrical assembly by driving rotation of the electric generator with the at least one turbocompressor, identifying a failure of the electric generator, and configuring the propulsion system in a failed generator operating mode, in response to identifying the failure of the generator, by: directing the combustion gas from the exhaust outlet to the turbine by directing the combustion gas from the exhaust outlet directly to the turbine with the engine exhaust diverter subassembly and decoupling the at least one turbocompressor from the electric generator with a clutch.

In any of the aspects or embodiments described above and herein, the method may further include generating electrical power with a first electric generator and a second electric generator of an electrical assembly by driving rotation of the first electric generator with a first turbocompressor of the at least one turbocompressor and driving rotation of the second electric generator with a second turbocompressor of the at least one turbocompressor, identifying a failure of the second electric generator, and configuring the propulsion system in a failed generator operating mode, in response to identifying the failure of the second electric generator, by: isolating the combustion gas from the turbine of the first turbocompressor with the engine exhaust diverter subassembly of a flow control assembly and isolating the compressed air from the compressor of the second turbocompressor to the engine with the at least one compressor outlet diverter subassembly.

The present disclosure, and all its aspects, embodiments and advantages associated therewith will become more readily apparent in view of the detailed description provided below, including the accompanying drawings.

DETAILED DESCRIPTION

Figure 1:
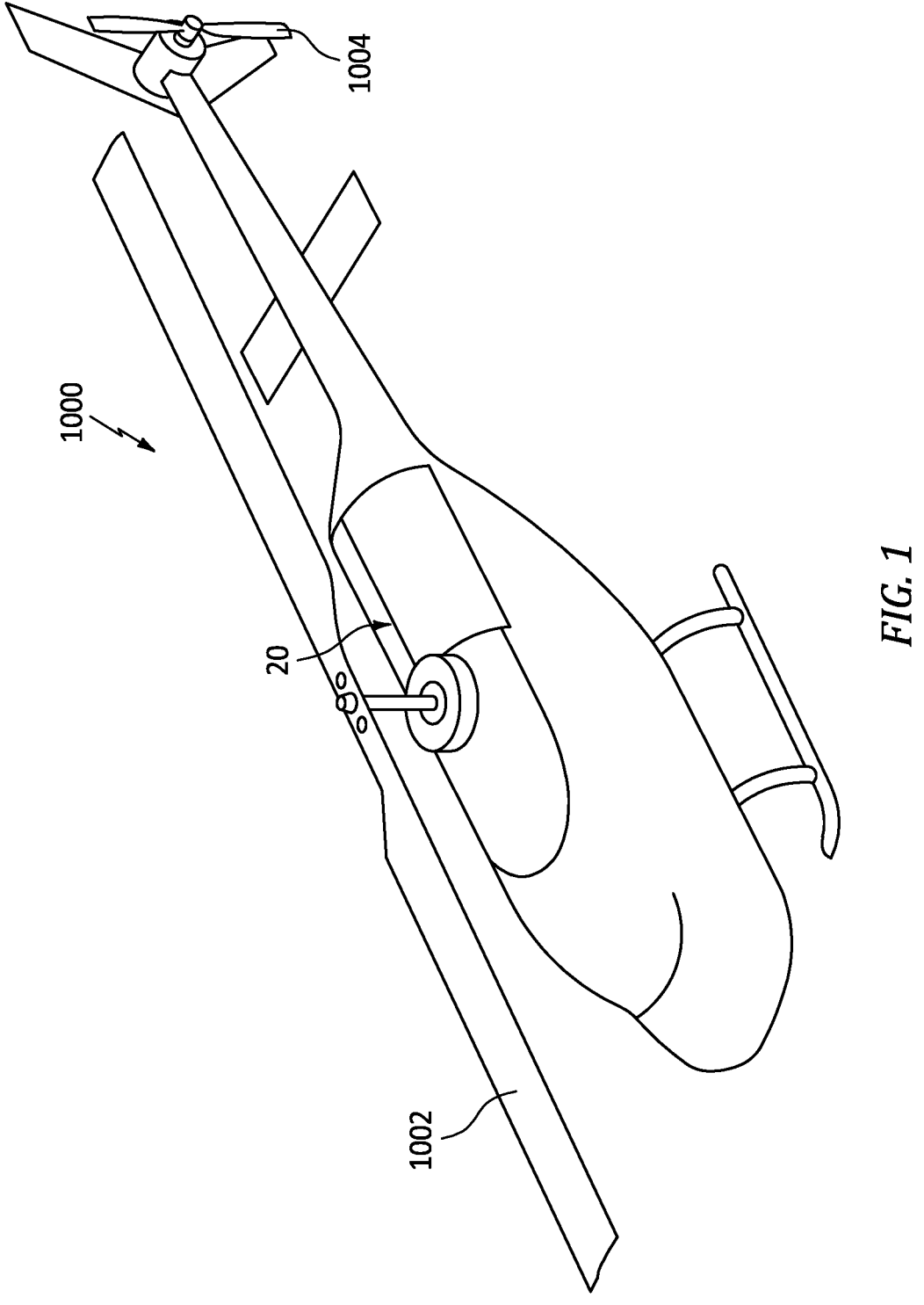
FIG. 1 illustrates a perspective view of an aircraft, in accordance with one or more embodiments of the present disclosure.

FIG. 1 illustrates a perspective view of an aircraft 1000 including an aircraft propulsion system. Briefly, the aircraft 1000 of FIG. 1 is configured as a rotary-wing aircraft (e.g., a helicopter). However, aspects of the present disclosure may be equally applicable to other the aircraft configurations such as, but not limited to, a fixed-wing aircraft (e.g., an airplane), a tilt-rotor aircraft, a tilt-wing aircraft, or another aerial vehicle. Moreover, the aircraft may be a manned aerial vehicle or an unmanned aerial vehicle (UAV, e.g., a drone). As will be discussed in further detail, the aircraft propulsion system is configured to facilitate propulsion and electrical power generation for the aircraft 1000. For example, the aircraft propulsion system is configured to drive rotation of a propulsor 1002 of the aircraft 1000 to provide propulsion (e.g., generate thrust) and/or to provide lift for the aircraft 1000. The propulsor 1002 of FIG. 1 is configured as a main rotor for the aircraft 1000. The aircraft propulsion system may additionally be configured to drive rotation of a tail rotor 1004 for the aircraft 1000.

Figure 2:
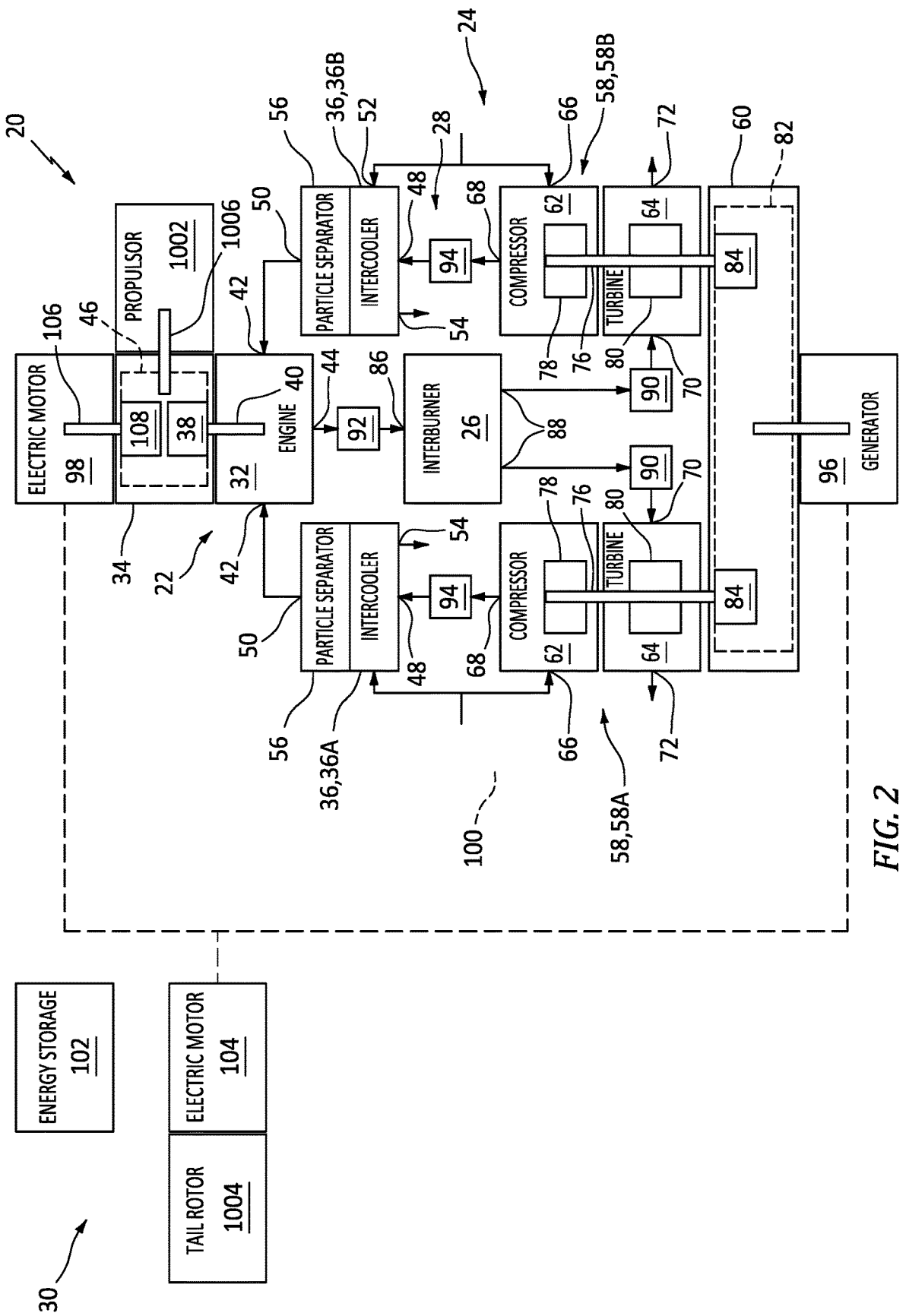
FIG. 2 schematically illustrates a propulsion system for an aircraft, in accordance with one or more embodiments of the present disclosure.

FIG. 2 schematically illustrates a propulsion system 20 for the aircraft 1000 (see FIG. 1). The propulsion system 20 of FIG. 2 includes an engine assembly 22, a turbocompressor assembly 24, an interburner 26, a flow control assembly 28, and an electrical assembly 30.

The engine assembly 22 of FIG. 2 includes an engine 32, a gearbox 34, and one or more intercoolers 36. The engine assembly 22 may additionally include a clutch 38.

The engine 32 is an internal combustion engine configured to use intermittent combustion during operation. In other words, the engine 32 may be an engine configuration other than a gas turbine engine configuration. For example, the engine 32 may be a reciprocating engine such as, but not limited to, a piston engine or a rotary engine (e.g., a Wankel engine). The engine 32 includes an engine output shaft 40, an air inlet 42, and an exhaust outlet 44. The engine 32 is configured to drive rotation of the engine output shaft 40. The engine 32 is configured to receive compressed air (e.g., from the one or more intercoolers 36) at the air inlet 42. The engine 32 is further configured to direct combustion gas from the exhaust outlet 44 (e.g., to the interburner 26 and/or the one or more turbocompressor assemblies 24).

The gearbox 34 includes at least one gear assembly 46 operably connected (e.g., coupled) with and between the engine output shaft 40 and the propulsor 1002 to facilitate the engine 32 (e.g., the engine output shaft 40) driving rotation of the propulsor 1002. For example, the gear assembly 46 may operably connect the engine output shaft 40 with an input shaft 1006 of the propulsor 1002. The gear assembly 46 may include an epicyclic gear assembly (e.g., a planetary gear assembly) operably connecting the engine output shaft 40 and the propulsor 1002. The present disclosure, however, is not limited to any particular gear configuration for the gear assembly 46. The gear assembly 46 may be configured as a speed-changing gear assembly to drive rotation of the propulsor 1002 at a different (e.g., reduced) rotational speed relative to the engine output shaft 40.

Each of the intercoolers 36 is configured as a heat exchanger for cooling air directed to the air inlet 40 of the engine 32 (e.g., from the turbocompressor assemblies 24). The engine assembly 22 of FIG. 2 includes two intercoolers 36, for example, a first intercooler 36A and a second intercooler 36B. However, the present disclosure is not limited to any particular number of intercoolers 36 for the engine assembly 22. Each of the intercoolers 36, 36A, 36B includes a first inlet 48 and a first outlet 50 for a primary heat exchanger side of the intercoolers 36, 36A, 36B. Each of the intercoolers 36, 36A, 36B includes a second inlet 52 and a second outlet 54 for a secondary heat exchanger side of the intercoolers 36, 36A, 36B. The first outlet 50 is connected in fluid communication with the air inlet 42 (e.g., using any suitable conduit, pipe, tube, hose, etc.). Each of the intercoolers 36, 36A, 36B is configured to receive cooling air (e.g., ambient air from an air intake of the aircraft 1000; see FIG. 1) at the second inlet 52. Each of the intercoolers 36, 36A, 36B is configured to exhaust this cooling air from the propulsion system 20 through the second outlet 54.

Each of the intercoolers 36, 36A, 36B may include a particle separator 56 in the primary heat exchanger side to remove all or a substantial portion of particulate matter entrained in air flowing through the primary heat exchanger side from the first inlet 48 to the first outlet 50. The particle separator 56 may be configured, for example, as a particulate filter (e.g., a replaceable air filter medium). The particle separator 56 of the present disclosure, however, is not limited to particulate filter configurations.

The engine output shaft 40 may be operably connected (e.g., coupled) to the gear assembly 46 by the clutch 38. The clutch 38 is configured as a one-way clutch (e.g., a sprag clutch) configured to allow the engine 32 (e.g., the engine output shaft 40) to drive or assist rotation of the propulsor 1002, but to prevent the engine output shaft 40 from being rotationally driven by the gear assembly 46, during at least some modes of propulsion system 20 operation (e.g., a normal cruising operating mode, a normal takeoff operating mode, etc.). In some embodiments, the clutch 38 may include a locking feature. The locking feature may be selectively engaged to facilitate the gear assembly 46 driving or assisting rotation of the engine output shaft 40 during at least some other modes of propulsion system 20 operation (e.g., a normal propulsion system startup operating mode), by allowing the clutch 38 to transmit rotational force in either rotational direction. The locking feature may be a low-speed passive locking feature in which the clutch 38 may transmit rotational force to the engine output shaft 40 at low rotation speeds but freewheel as the rotation speed increases above a threshold value.

The turbocompressor assembly 24 of FIG. 2 includes one or more turbocompressors 58. The turbocompressor assembly 24 of FIG. 2 includes two turbocompressors 58, for example, a first turbocompressor 58A and a second turbocompressor 58B. However, the present disclosure is not limited to any particular number of turbocompressors 58 for the turbocompressor assembly 24. The turbocompressor assembly 24 may additionally include a gearbox 60.

Each of the turbocompressors 58, 58A, 58B includes a compressor 62 and a turbine 64. The compressor 62 includes an inlet 66 and an outlet 68. The compressor 62 is configured to receive air (e.g., ambient air from an air intake of the aircraft 1000; see FIG. 1) at the inlet 66. The turbine 64 includes an inlet 70 and an outlet 72. The turbine 64 is configured to receive a combustion gas (e.g., from the engine 32 and/or the interburner 26) at the inlet 70. The turbine 64 is configured to exhaust the combustion gas from the propulsion system 20 through the outlet 72.

Components of the compressor 62 and the turbine 64 form a rotational assembly 74 mounted for rotation about a rotational axis (e.g., an axial centerline of the turbocompressors 58, 58A, 58B). The rotational assembly 74 includes a shaft 76, a bladed compressor rotor 78 for the compressor 62, and a bladed turbine rotor 80 for the turbine 64. The shaft 76 interconnects the bladed compressor rotor 78 and the bladed turbine rotor 80.

The gearbox 60 includes at least one gear assembly 82 operably connected (e.g., coupled) with the rotational assembly 74 (e.g., the shaft 76) for one, more than one, or each of the turbocompressors 58. For example, the gear assembly 82 of FIG. 2 is operably connected to the shaft 76 of the first turbocompressor 58A and the shaft 76 of the second turbocompressor 58B. The gear assembly 82 may include an epicyclic gear assembly (e.g., a planetary gear assembly). The gear assembly 46 may be configured as a speed-changing gear assembly. The present disclosure, however, is not limited to any particular gear configuration for the gear assembly 82. The rotational assembly 74 (e.g., the shaft 76) may be operably connected (e.g., coupled) to the gear assembly 82 by a clutch 84. The clutch 84 is configured as a one-way clutch (e.g., a sprag clutch) configured to allow the rotational assembly 74 (e.g., the shaft 76) to drive or gear assembly 82, but to prevent the rotational assembly 74 (e.g., the shaft 76) from being rotationally driven by the gear assembly 82, during at least some modes of propulsion system 20 operation (e.g., a failed turbocompressor operating mode). In some embodiments, the clutch 84 may include a locking feature. The locking feature may be selectively engaged to facilitate the gear assembly 82 driving or assisting rotation of the rotational assembly 74 (e.g., the shaft 76) during at least some other modes of propulsion system 20 operation (e.g., a normal propulsion system startup operating mode), by allowing the clutch 84 to transmit rotational force in either rotational direction. The locking feature may be a low-speed passive locking feature in which the clutch 84 may transmit rotational force to the rotational assembly 74 (e.g., the shaft 76) at low rotation speeds but freewheel as the rotation speed increases above a threshold value. In some embodiments, the clutch 84 may further include one or more decoupling features. The decoupling features may fully decouple the clutch 84 from the rotational assembly 74 (e.g., the shaft 76).

The interburner 26 forms a combustion chamber in which air or another gas (e.g., combustion gas from the engine 32) is mixed and burned with fuel. The interburner 26 includes an inlet 86 and an outlet 88. The outlet 88 is connected in fluid communication (e.g., using any suitable conduit, pipe, tube, hose, etc.) with the inlet 70 of the turbine 64 for one, more than one, or each of the turbocompressors 58, 58A, 58B to direct combustion gas to the turbine 64 for one, more than one, or all of the turbocompressors 58, 58A, 58B. For example, the outlet 88 may be connected in fluid communication with the inlet 70 by a control valve 90 for each of the turbocompressors 58, 58A, 58B. The control valve 90 is positionable in an open position or a shut position. In the open position, the control valve 90 may direct the combustion gas from the interburner 26 (e.g., the outlet 88) to the turbine 64 (e.g., the inlet 70). In the closed position, the control valve 90 may prevent or substantially prevent the flow of the combustion gas from the interburner 26 (e.g., the outlet 88) to the turbine 64 (e.g., the inlet 70). The control valve 90 may be configured, for example, as a remotely-actuated butterfly valve (e.g., a high-temperature butterfly valve). The present disclosure, however, is not limited to the foregoing exemplary configuration of the control valve.

Figure 3B:
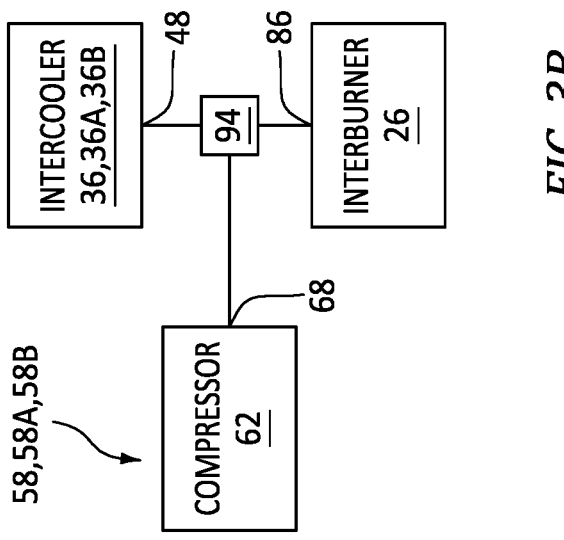
FIGS. 3A-B schematically illustrate portions of a flow control assembly for the propulsion system of FIG. 2, in accordance with one or more embodiments of the present disclosure.
Figure 3A:
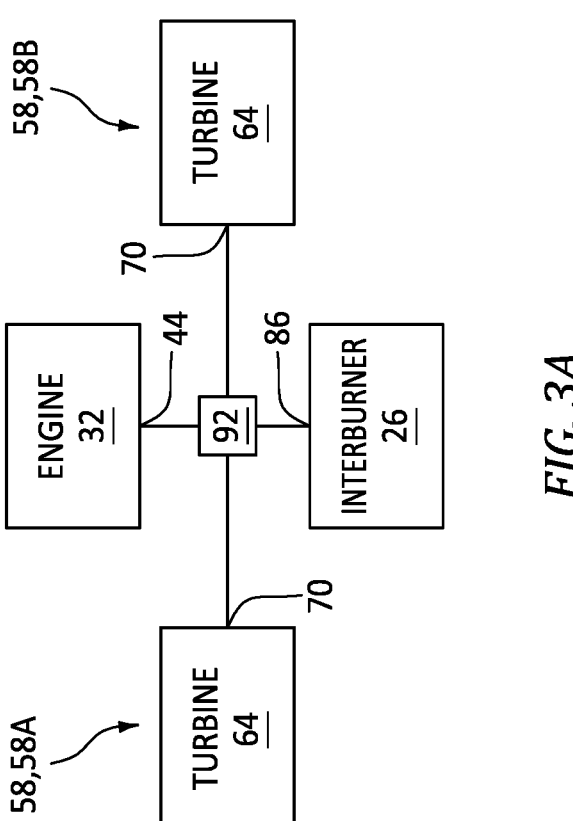

The flow control assembly 28 of FIG. 2 may include an engine exhaust diverter subassembly 92 and/or one or more compressor outlet diverter subassemblies 94. FIG. 3A further schematically illustrates the engine exhaust diverter subassembly 92. FIG. 3B further schematically illustrates the compressor outlet diverter subassemblies 94.

The engine exhaust diverter subassembly 92 is connected in fluid communication (e.g., using any suitable conduit, pipe, tube, hose, etc.) with and between the engine 32 (e.g., the exhaust outlet 44), the interburner 26 (e.g., the inlet 86), and the turbine 64 (e.g., the inlet 70) of one, more than one, or each of the turbocompressors 58, 58A, 58B. The engine exhaust diverter subassembly 92 is a multi-directional flow diverter. In a first condition, the engine exhaust diverter subassembly 92 may direct combustion gas from the exhaust outlet 44 to the inlet 86 (see, e.g., FIG. 2). In this first condition, the engine exhaust diverter subassembly 92 may prevent or substantially prevent the flow of the combustion gas from the exhaust outlet 44 to the turbine 64 (e.g., the inlet 70). In a second condition, the engine exhaust diverter subassembly 92 may direct combustion gas from the exhaust outlet 44 to the turbine 64 (e.g., the inlet 70) of one, more than one, or each of the turbocompressors 58 (see, e.g., FIG. 4). In this second condition, the engine exhaust diverter subassembly 92 may prevent or substantially prevent the flow of the combustion gas from the exhaust outlet 44 to the inlet 86. The engine exhaust diverter subassembly 92 is also configurable in a closed condition in which the combustion gas from the exhaust outlet 44 does not flow through the engine exhaust diverter subassembly 92 (e.g., to the interburner 26 or the turbine 64). In other words, in the closed condition, the engine exhaust diverter subassembly 92 isolates the exhaust outlet 44 from the inlet 86 and the inlet 70. The engine exhaust diverter subassembly 92 may be formed by a remotely-actuated multi-directional valve or an assembly of remotely-actuated valves configured to selectively direct the combustion gas from the exhaust outlet 44 as described above. The present disclosure, however, is not limited to the foregoing exemplary valve configuration of the engine exhaust diverter subassembly 92. In some embodiments, the flow control assembly 28 may not include the engine exhaust diverter subassembly 92, and combustion gas from the exhaust outlet 44 may be directed to the turbine 64 through the interburner 26 without regard to a combustion condition of the interburner 26 (e.g., with or without fuel directed to the interburner 26 for combustion).

Each of the compressor outlet diverter subassemblies 94 is connected in fluid communication (e.g., using any suitable conduit, pipe, tube, hose, etc.) with and between the compressor 62 (e.g., the outlet 68) of a respective one of the turbocompressors 58, 58A, 58B, a respective one of the intercoolers 36, 36A, 36B (e.g., the first inlet 48), and the interburner 26 (e.g., the inlet 86). The compressor outlet diverter subassemblies 94 is a multi-directional flow diverter. In a first condition, each of the compressor outlet diverter subassemblies 94 may direct compressed air from the outlet 68 to the first inlet 48 (see, e.g., FIG. 2). In this first condition, each of the compressor outlet diverter subassemblies 94 may prevent or substantially prevent the flow of the compressed air from the outlet 68 to the interburner 26 (e.g., the inlet 86). In a second condition, each of the compressor outlet diverter subassemblies 94 may direct compressed air from the outlet 68 to the interburner 26 (e.g., the inlet 86) (see, e.g., FIG. 5). In this second condition, each of the compressor outlet diverter subassemblies 94 may prevent or substantially prevent the flow of the compressed air from the outlet 68 to the first inlet 48. The compressor outlet diverter subassemblies 94 are also configurable in a closed condition in which the compressed air from the outlet 68 does not flow through the respective one of the compressor outlet diverter subassemblies 94 (e.g., to the engine 32 or the interburner 26). In other words, in the closed condition, the compressor outlet diverter subassemblies 94 isolate the outlet 68 from the air inlet 42 (e.g., the first inlet 48) and the inlet 86. Each of the compressor outlet diverter subassemblies 94 may be formed by a remotely-actuated multi-directional valve or an assembly of remotely-actuated valves configured to selectively direct the compressed air from the outlet 68 as described above. The present disclosure, however, is not limited to the foregoing exemplary valve configuration of the compressor outlet diverter subassemblies 94.

The electrical assembly 30 includes an electric generator 96, an electric motor 98, and an electrical distribution system 100. The electrical assembly 30 may additionally include an energy storage device 102 and/or an electric motor 104.

The electric generator 96 is operably connected (e.g., coupled) to the gearbox 60 (e.g., the gear assembly 82). The electric generator 96 is electrically connected to the electrical distribution system 100. The electric generator 96 is configured to generate an electrical power output, in response to driving rotation from the rotational assembly 74 of one, more than one, or each of the turbocompressors 58, 58A, 58B through the gear assembly 82, and direct the electrical power output to the electrical distribution system 100. The electrical power output of the electric generator 96 may be in the form of an alternating current (AC) or a direct current (DC), and the present disclosure is not limited to any particular configuration of the electric generator 96. The electric generator 96 may additionally be selectively configurable as an electric motor, for example, to drive rotation of the rotational assembly 74 of one, more than one, or each of the turbocompressors 58, 58A, 58B through the gear assembly 82 during at least some other modes of propulsion system 20 operation (e.g., a normal propulsion system startup operating mode).

The electric motor 98 includes an output shaft 106. The electric motor 98 may additionally include a clutch 108. The output shaft 106 is operably connected (e.g., coupled) to the engine 32 and the propulsor 1002 by the gearbox 34 (e.g., the gear assembly 46). For example, the output shaft 106 may be coupled with the gear assembly 46 by the clutch 108. The clutch 108 may be configured as a one-way clutch (e.g., a sprag clutch) configured to allow the electric motor 98 to drive or assist rotation of the engine 32 and/or the propulsor 1002, but to prevent the electric motor 98 from being rotationally driven by the engine 32 or the propulsor 1002. The electric motor 98 is electrically connected to the electrical distribution system 100 and configured to receive electrical power from the electrical distribution system 100 for operation of the electric motor 98.

The electrical distribution system 100 electrically connects components of the electrical assembly 30. The electrical distribution system 100 includes switchgear, cables, wires, breakers, switches, and/or other electrical components to effect the transfer of electrical power between components of the electrical assembly 30. The electrical distribution system 100 may additionally include one or more electrical power controllers, for example, to control a magnitude and/or direction of electrical current flow to components of the electrical assembly 30.

The energy storage device 102 may be configured to store electrical energy (e.g., generated by the electric generator 96) for use by components of the electrical assembly 30. The energy storage device 102 may be configured as a capacitor (e.g., a supercapacitor), a battery, a hydrogen fuel cell, and/or another electrical energy storage device.

The electric motor 104 may be operably connected (e.g., directly coupled) to the tail rotor 1004 to control and drive rotation of the tail rotor 1004. The electric motor 104 is electrically connected to the electrical distribution system 100 and configured to receive electrical power from the electrical distribution system 100 for operation of the electric motor 104.

The propulsion system 20 of the present disclosure is selectively configurable in a plurality of different operating modes as shown, for example, in FIGS. 2 and 4-7. These operating modes include normal operating modes of the propulsion system 20 as well as failure operating modes. The failure operating modes of the propulsion system 20 facilitate continued operation of the propulsion system 20 in response to failure of one or more propulsion system 20 components and component assemblies including, but not limited to, the engine assembly 22, the turbocompressors 58, and the electric generator 96.

Still referring to FIG. 2, the propulsion system 20 may be configured in a normal takeoff operating mode. In the normal takeoff operating mode of the propulsion system 20, ambient air is directed (e.g., from an aircraft air intake) to the intercoolers 36 (e.g., the second inlet 52) and the compressor 62 (e.g., the inlet 66) for each of the turbocompressors 58. The ambient air is compressed by the compressor 62 and directed, by a respective one of the compressor outlet diverter subassemblies 94, to a respective one of the intercoolers 36 (e.g., the first inlet 48). The compressed air is directed through the intercoolers 36 (e.g., the primary heat exchanger side) where the compressed air is cooled (and, in some embodiments, filtered by the particle separator 56), and then supplied to the engine 32 (e.g., the air inlet 42). The compressed air is mixed and burned with fuel in the engine 32 in an intermittent combustion cycle to drive rotation of the engine output shaft 40 and, hence, the propulsor 1002, through the gearbox 34 (e.g., the gear assembly 46). Combustion gas from the engine 32 is directed from the exhaust outlet 44 to the interburner 26 (e.g., the inlet 86) by the engine exhaust diverter subassembly 92. This combustion gas from the engine 32 is mixed and burned with fuel in the interburner 26, and the resultant combustion gas is directed (e.g., by the control valve 90) from the outlet 88 to the inlet 70 and through the turbine 64 for each of the turbocompressors 58. The bladed turbine rotor 80 rotationally drives the rotational assembly 74 in response to the combustion gas flow through the turbine 64. In particular, the bladed turbine rotor 80 rotationally drives the bladed compressor rotor 78, to compress the ambient air for the engine 32, and the electric generator 96 (e.g., through the gearbox 60 and its gear assembly 82) to generate electrical power for components of the electrical assembly 30. During operation of the propulsion system 20 in the normal takeoff operating mode, the electric motor 98 may be selectively operated to assist rotation of the propulsor 1002 (e.g., through the gearbox 34 and its gear assembly 46) using electrical power from the electrical distribution system 100 (e.g., the electric generator 96 and/or the energy storage device 102). Similarly, the electric motor 104 may be selectively operated to control and drive rotation of the tail rotor 1004 using electrical power from the electrical distribution system 100 (e.g., the electric generator 96 and/or the energy storage device 102).

Still referring to FIG. 2, the propulsion system 20 may be configured in a normal startup operating mode. In the normal startup operating mode of the propulsion system 20, the propulsion system 20 may be configured similar to that described for the normal takeoff operating mode, except that the electric motor 98 and the electric generator 96 may be operated to respectively drive rotation of the engine output shaft 40 and the rotational assembly 74 for each of the turbocompressors 58, to facilitate a propulsion system startup sequence for the engine 32 and the turbocompressors 58. For example, the electric motor 98 may drive rotation of the engine output shaft 40, through the gearbox 34 (e.g., the gear assembly 46), with the clutch 38 having the locking feature engaged. Similarly, the electric generator 96 may drive rotation of the rotational assembly 74 for each of the turbocompressors 58, through the gearbox 60 (e.g., the gear assembly 82), with the clutch 84, having the locking feature engaged. As rotation speeds of the engine output shaft 40 and the rotational assembly 74 for each of the turbocompressors 58 increases during the propulsion system startup sequence, the locking feature for the clutch 38 and the clutch 84 may disengage.

Figure 4:
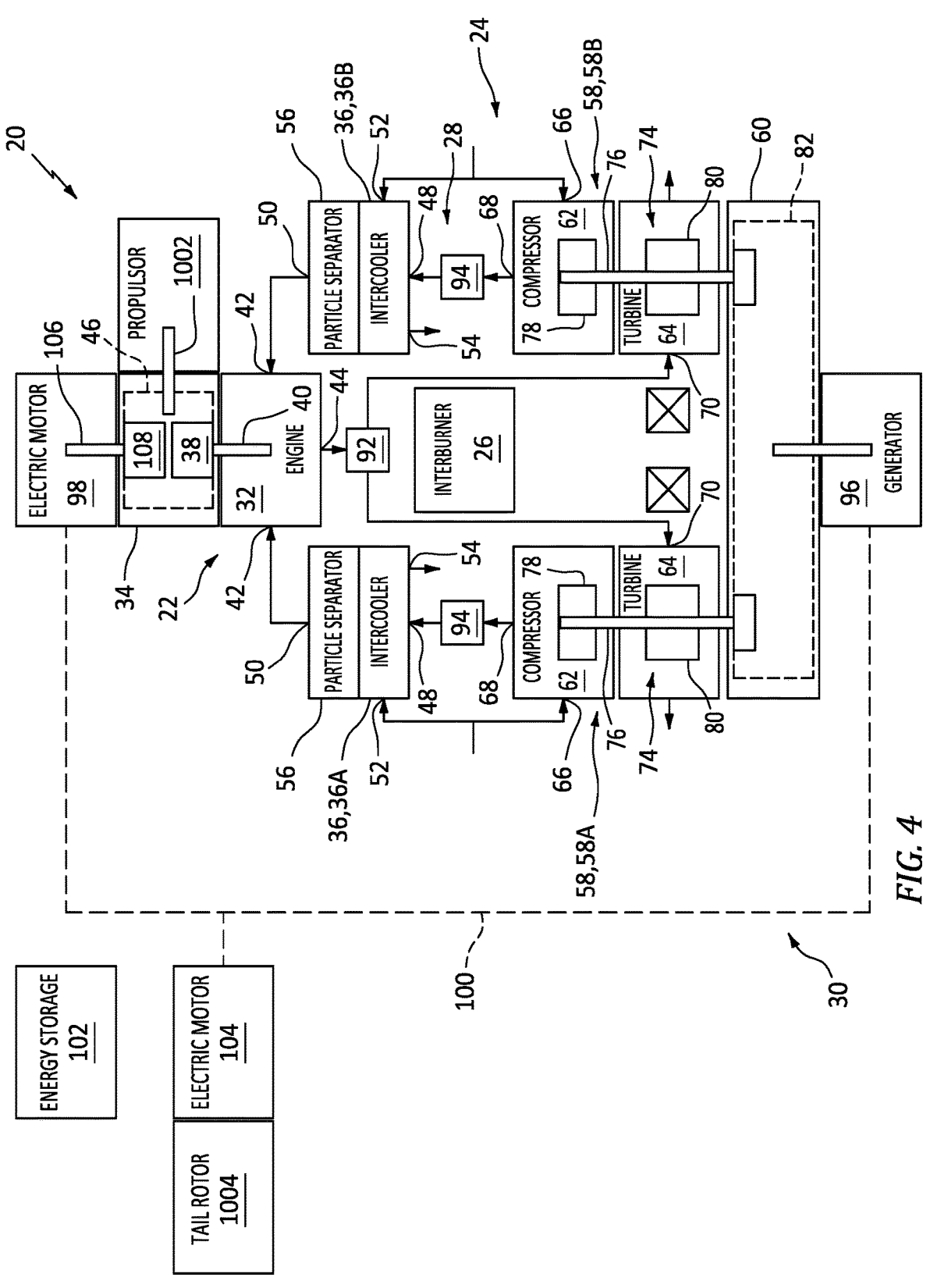
FIG. 4 schematically illustrates the propulsion system of FIG. 2 with another mode of operation, in accordance with one or more embodiments of the present disclosure.

Referring to FIG. 4, the propulsion system 20 may be configured in a normal cruise operating mode. In the normal cruise operating mode of the propulsion system 20, ambient air is directed (e.g., from an aircraft air intake) to the intercoolers 36, 36A, 36B (e.g., the second inlet 52) and the compressor 62 (e.g., the inlet 66) for each of the turbocompressors 58, 58A, 58B. The ambient air is compressed by the compressor 62 and directed from the outlet 68, by a respective one of the compressor outlet diverter subassemblies 94, to a respective one of the intercoolers 36 (e.g., the first inlet 48). The compressed air is directed through the intercoolers 36 (e.g., the primary heat exchanger side) where the compressed air is cooled (and, in some embodiments, filtered by the particle separator 56), and then supplied to the engine 32 (e.g., the air inlet 42). The compressed air is mixed and burned with fuel in the engine 32 in an intermittent combustion cycle to drive rotation of the engine output shaft 40 and, hence, the propulsor 1002, through the gearbox 34 (e.g., the gear assembly 46). Combustion gas from the engine 32 is directed from the exhaust outlet 44 directly to the turbine 64 (e.g., the inlet 70) for each of the turbocompressors 58 by the engine exhaust diverter subassembly 92 (e.g., bypassing the interburner 26). The bladed turbine rotor 80 rotationally drives the rotational assembly 74 in response to the combustion gas flow through the turbine 64. In particular, the bladed turbine rotor 80 rotationally drives the bladed compressor rotor 78, to compress the ambient air for the engine 32, and the electric generator 96 (e.g., through the gearbox 60 and its gear assembly 82) to generate electrical power for components of the electrical assembly 30. During operation of the propulsion system 20 in the normal cruise operating mode, the electric motor 98 may be selectively operated to assist rotation of the propulsor 1002 (e.g., through the gearbox 34 and its gear assembly 46) using electrical power from the electrical distribution system 100 (e.g., the electric generator 96 and/or the energy storage device 102). Similarly, the electric motor 104 may be selectively operated to control and drive rotation of the tail rotor 1004 using electrical power from the electrical distribution system 100 (e.g., the electric generator 96 and/or the energy storage device 102).

Figure 5:
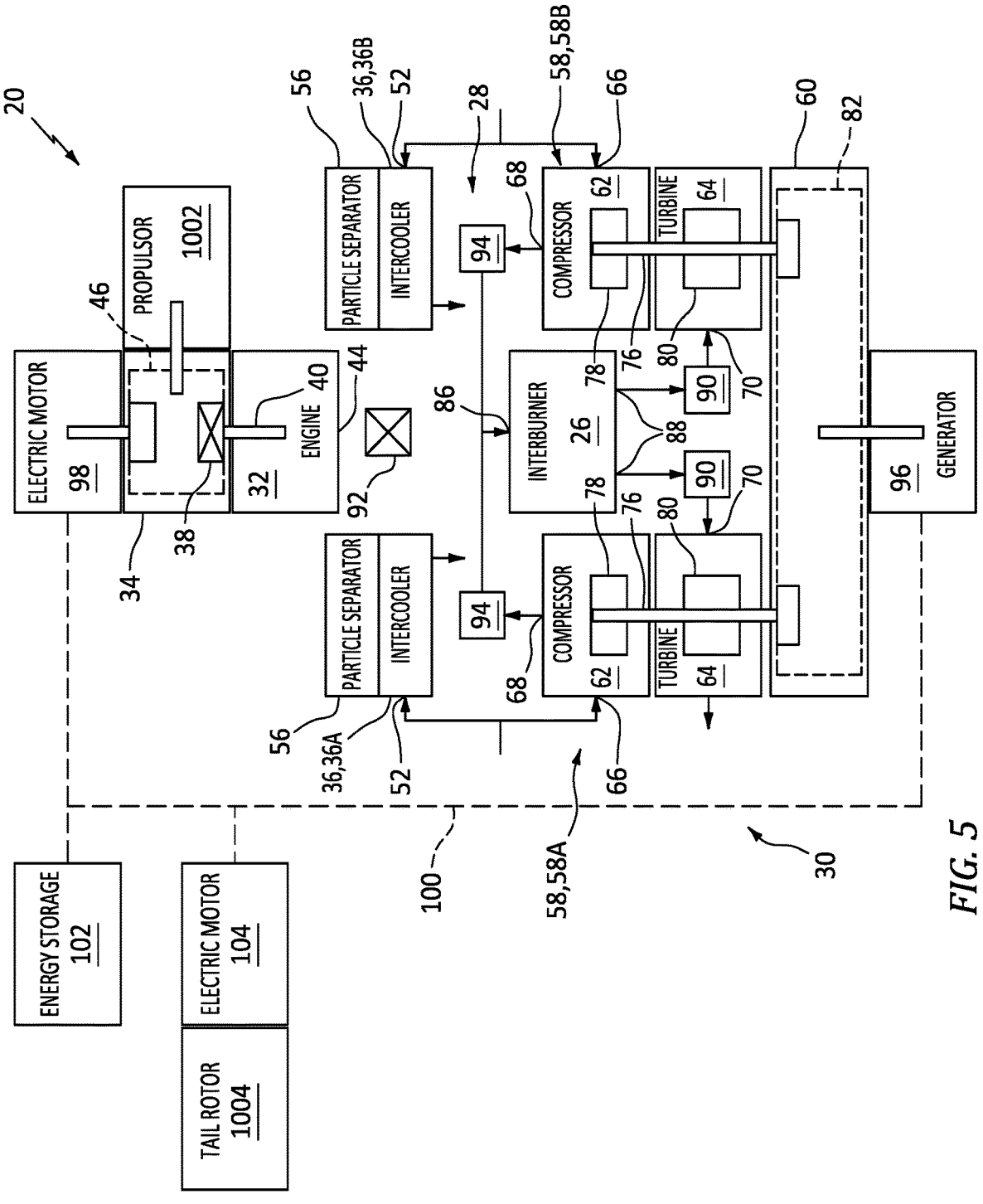
FIG. 5 schematically illustrates the propulsion system of FIG. 2 with another mode of operation, in accordance with one or more embodiments of the present disclosure.

Referring to FIG. 5, the propulsion system 20 may be configured in a failed engine operating mode in response to identification of an inoperative or degraded condition of the engine 32. In the failed engine operating mode of the propulsion system 20, ambient air is directed (e.g., from an aircraft air intake) to the compressor 62 (e.g., the inlet 66) for each of the turbocompressors 58, 58A, 58B. The ambient air is compressed by the compressor 62 and directed, by a respective one of the compressor outlet diverter subassemblies 94, from the outlet 68 to the interburner 26 (e.g., the inlet 86). The compressed air from the compressor 62 is mixed and burned with fuel in the interburner 26, and the resultant combustion gas is directed (e.g., by the control valve 90) from the outlet 88 to the inlet 70 and through the turbine 64 for each of the turbocompressors 58. The bladed turbine rotor 80 rotationally drives the rotational assembly 74 in response to the combustion gas flow through the turbine 64. In particular, the bladed turbine rotor 80 rotationally drives the bladed compressor rotor 78, to compress the ambient air for the interburner 26, and the electric generator 96 (e.g., through the gearbox 60 and its gear assembly 82) to generate electrical power for components of the electrical assembly 30. The engine 32 (e.g., the exhaust outlet 44) may be isolated from the interburner 26 (e.g., the inlet 86) and the turbine 64 (e.g., the inlet 70) for each of the turbocompressors 58 by the engine exhaust diverter subassembly 92 in the closed condition. During operation of the propulsion system 20 in the failed engine operating mode, the electric motor 98 (e.g., solely) drives rotation of the propulsor 1002 (e.g., through the gearbox 34 and its gear assembly 46) using electrical power from the electrical distribution system 100 (e.g., the electric generator 96 and/or the energy storage device 102). The engine output shaft 40 is operably decoupled and/or disengaged from the gear assembly 46 by the clutch 38. The electric motor 104 may be selectively operated to control and drive rotation of the tail rotor 1004 using electrical power from the electrical distribution system 100 (e.g., the electric generator 96 and/or the energy storage device 102).

Figure 6:
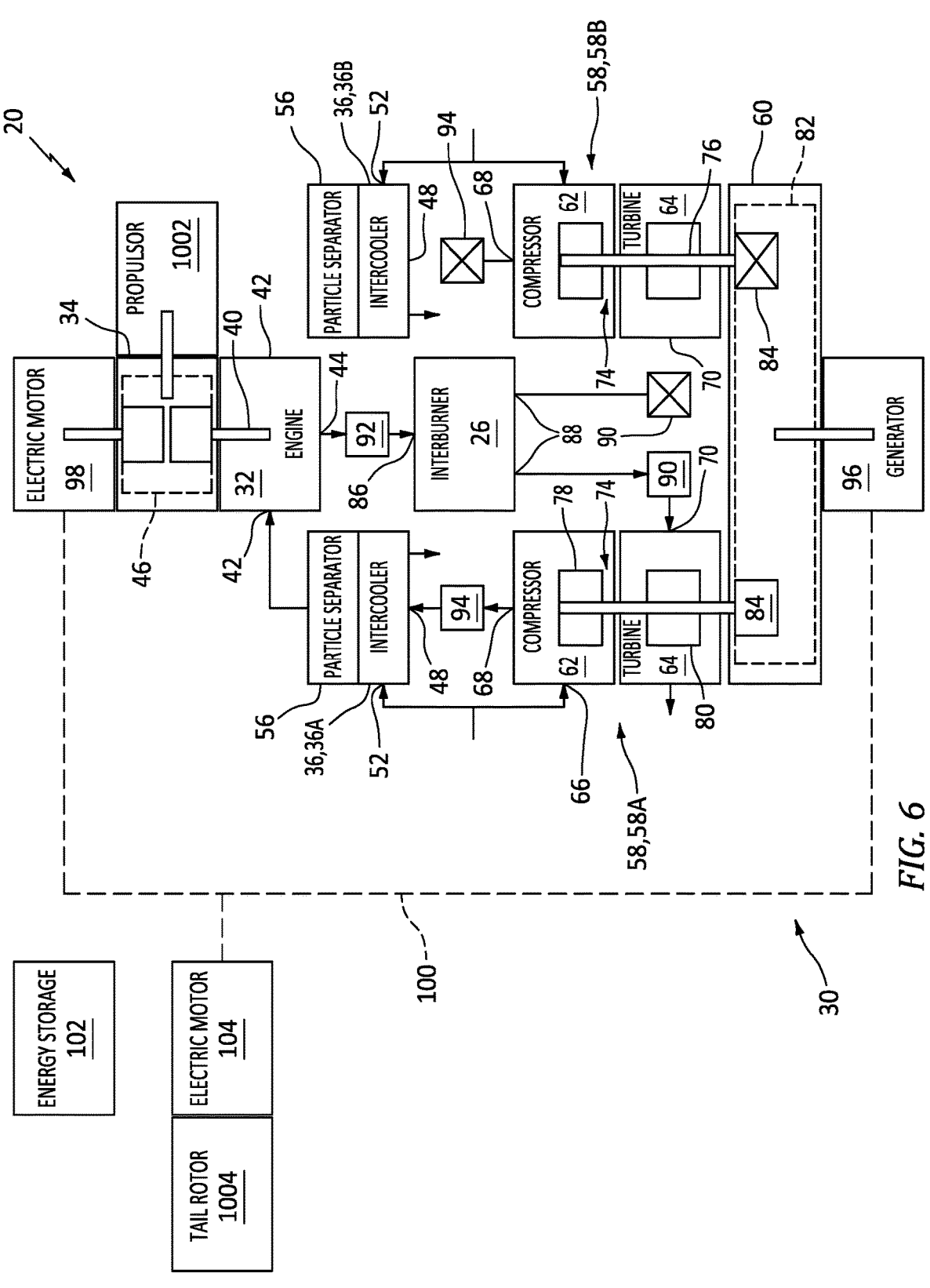
FIG. 6 schematically illustrates the propulsion system of FIG. 2 with another mode of operation, in accordance with one or more embodiments of the present disclosure.

Referring to FIG. 6, the propulsion system 20 may be configured in a failed turbocompressor operating mode in response to identification of an inoperative or degraded condition of one of the turbocompressors 58, 58A, 58B. As shown in FIG. 6, for example, the turbocompressor 58A is an operating turbocompressor and the turbocompressor 58B is a failed turbocompressor. In the failed turbocompressor operating mode of the propulsion system 20, ambient air is directed (e.g., from an aircraft air intake) to the intercooler 36A (e.g., the second inlet 52) and the compressor 62 (e.g., the inlet 66) for the turbocompressor 58A. The ambient air is compressed by the compressor 62 for the turbocompressor 58A and directed, by a respective one of the compressor outlet diverter subassemblies 94, from the outlet 68 to the intercooler 36A (e.g., the first inlet 48). The intercooler 36B (e.g., the first inlet 48) may be isolated from the compressor 62 (e.g., the outlet 68) for the turbocompressor 58B by a respective one of the compressor outlet diverter subassemblies 94 in the closed condition. The particle separator 56 of the intercooler 36B may prevent debris from the failed turbocompressor 58B (e.g., compressor blade fragments) from being carried to the engine 32 (e.g., air inlet 42) as the turbocompressor 58B is shut down and isolated. The compressed air from the compressor 62 of the turbocompressor 58A is directed through the intercooler 36A (e.g., the primary heat exchanger side) where the compressed air is cooled (and, in some embodiments, filtered by the particle separator 56), and then supplied to the engine 32 (e.g., the air inlet 42). The compressed air is mixed and burned with fuel in the engine 32 in an intermittent combustion cycle to drive rotation of the engine output shaft 40 and, hence, the propulsor 1002, through the gearbox 34 (e.g., the gear assembly 46). Combustion gas from the engine 32 is directed from the exhaust outlet 44 to the interburner 26 (e.g., the inlet 86) by the engine exhaust diverter subassembly 92. This combustion gas from the engine 32 is mixed and burned with fuel in the interburner 26, and the resultant combustion gas is directed (e.g., by the control valve 90)

from the outlet 88 to the inlet 70 and through the turbine 64 for the turbocompressor 58A. The interburner 26 (e.g., the outlet 88) may be isolated from the turbine 64 (e.g., the inlet 70) for the turbocompressor 58B by the control valve 90 in the closed position. The bladed turbine rotor 80 of the turbine 64 for the turbocompressor 58A rotationally drives the rotational assembly 74 in response to the combustion gas flow through the turbine 64. In particular, the bladed turbine rotor 80 rotationally drives the bladed compressor rotor 78, to compress the ambient air for the engine 32, and the electric generator 96 (e.g., through the gearbox 60 and its gear assembly 82) to generate electrical power for components of the electrical assembly 30. The rotational assembly 74 (e.g., the shaft 76) of the turbocompressor 58B is operably decoupled and/or disengaged from the gear assembly 82 by the clutch 84. During operation of the propulsion system 20 in the failed turbocompressor operating mode, the electric motor 98 may be selectively operated to assist rotation of the propulsor 1002 (e.g., through the gearbox 34 and its gear assembly 46) using electrical power from the electrical distribution system 100 (e.g., the electric generator 96 and/or the energy storage device 102). Similarly, the electric motor 104 may be selectively operated to control and drive rotation of the tail rotor 1004 using electrical power from the electrical distribution system 100 (e.g., the electric generator 96 and/or the energy storage device 102).

Figure 7:
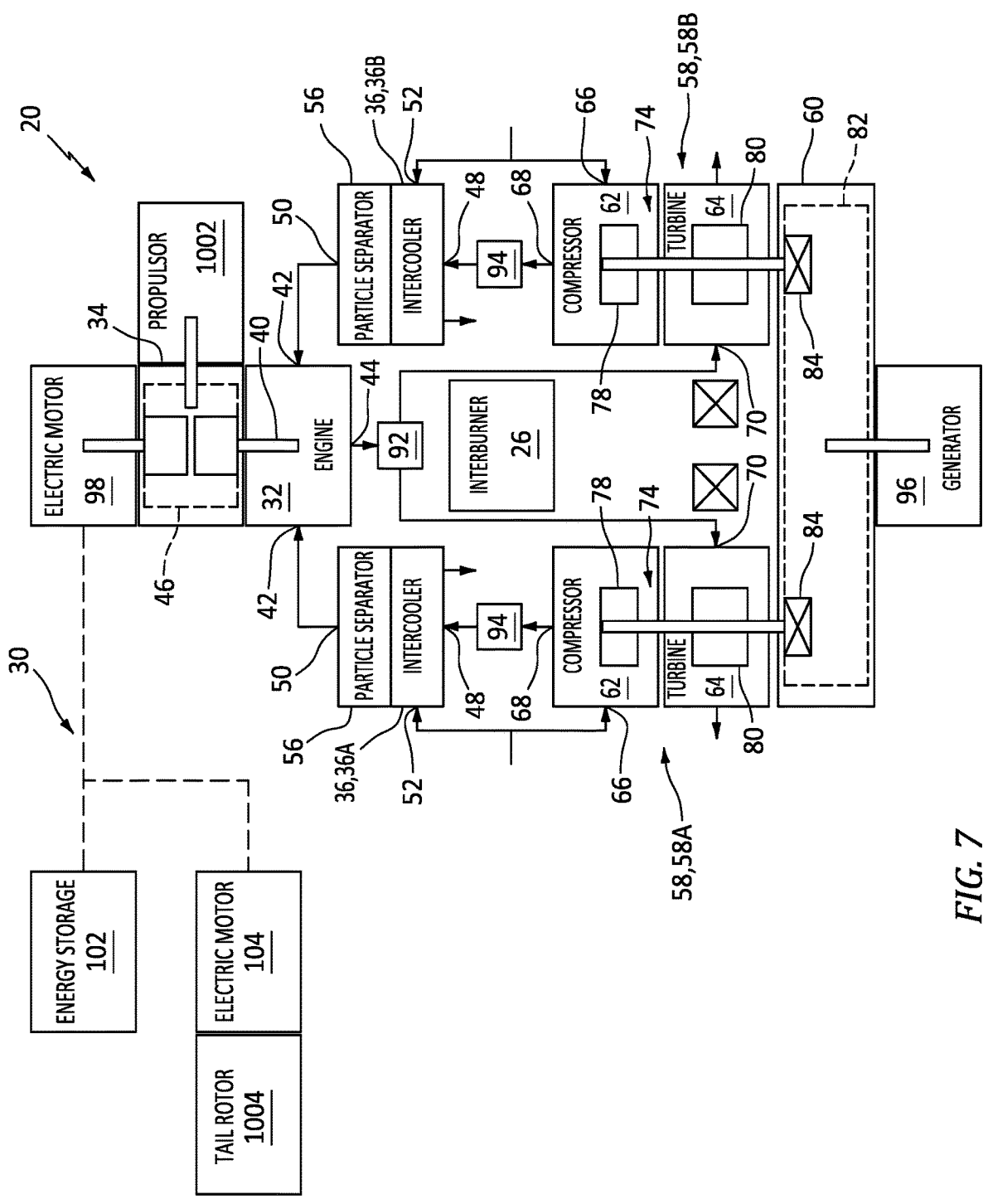
FIG. 7 schematically illustrates the propulsion system of FIG. 2 with another mode of operation, in accordance with one or more embodiments of the present disclosure.

Referring to FIG. 7, the propulsion system 20 may be configured in a failed generator operating mode in response to identification of an inoperative or degraded condition of electric generator 96 or a failure or condition of one or more electrically downstream components of the electrical assembly 30 (e.g., a fire, an arc fault detection condition, an electrical short, etc.) which prevents the electric generator 96 from operating and/or from generating an electrical power output for the electrical assembly 30. In the failed generator operating mode of the propulsion system 20, ambient air is directed (e.g., from an aircraft air intake) to the intercoolers 36, 36A, 36B (e.g., the second inlet 52) and the compressor 62 (e.g., the inlet 66) for each of the turbocompressors 58, 58A, 58B. The ambient air is compressed by the compressor 62 and directed, by a respective one of the compressor outlet diverter subassemblies 94, from the outlet 68 to a respective one of the intercoolers 36 (e.g., the first inlet 48). The compressed air is directed through the intercoolers 36 (e.g., the primary heat exchanger side) where the compressed air is cooled (and, in some embodiments, filtered by the particle separator 56), and then supplied to the engine 32 (e.g., the air inlet 42) from the first outlet 50. The compressed air is mixed and burned with fuel in the engine 32 in an intermittent combustion cycle to drive rotation of the engine output shaft 40 and, hence, the propulsor 1002, through the gearbox 34 (e.g., the gear assembly 46). Combustion gas from the engine 32 is directed from the exhaust outlet 44 directly to the turbine 64 (e.g., the inlet 70) for each of the turbocompressors 58 by the engine exhaust diverter subassembly 92 (e.g., bypassing the interburner 26). The bladed turbine rotor 80 rotationally drives the rotational assembly 74 in response to the combustion gas flow through the turbine 64. In particular, the bladed turbine rotor 80 rotationally drives the bladed compressor rotor 78 to compress the ambient air for the engine 32. The rotational assembly 74 for each of the turbocompressors 58 is operably decoupled and/or disengaged from the gear assembly 82 by a respective clutch 84 (e.g., a decoupling feature of the clutch 84), thereby preventing the electric generator 96 from being driven by the rotational assembly 74 for each of the turbocompressors 58. During operation of the propulsion system 20 in the failed generator operating mode, the electric motor 98 and/or the electric motor 104 may be selectively operated, using electrical power from the energy storage device 102, to respectively drive rotation of the propulsor 1002 and/or the tail rotor 1004.

The present disclosure configuration of the propulsion system 20 facilitates reduced weight and fuel consumption, for example, in comparison to a conventional dual turboshaft gas turbine engine propulsion system, while also facilitating improved reliability (e.g., failure operating modes), for example, in comparison to at least some conventional single-engine propulsion systems. Moreover, the present disclosure configuration of the propulsion system 20 facilitates improved electrification for tail rotor control, propulsion system start sequences, and propulsion system 20 output power for the propulsor 1002 (e.g., during takeoff or other high propulsion demand conditions).

Figure 8:
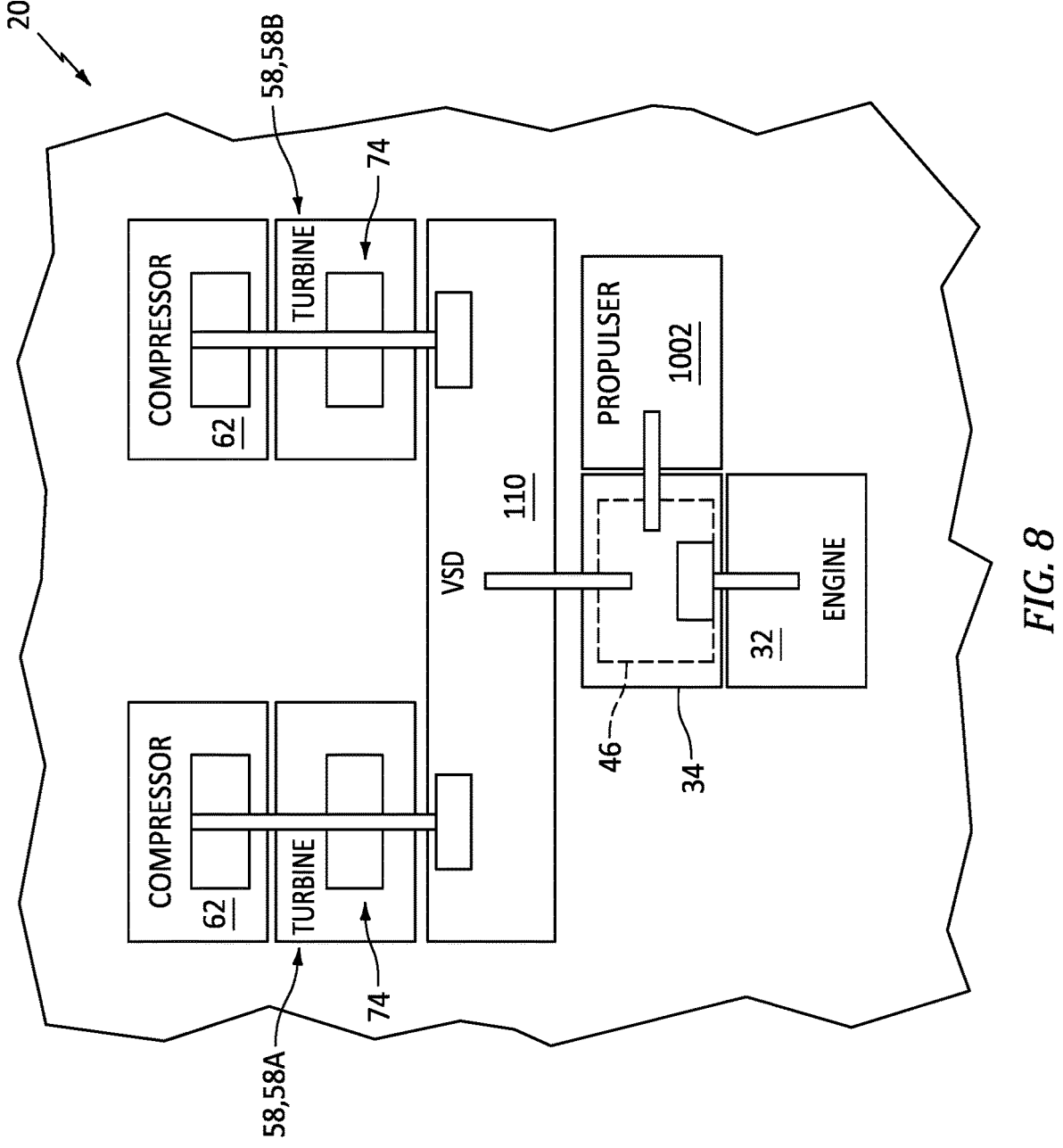
FIG. 8 schematically illustrates a portion of another propulsion system for an aircraft, in accordance with one or more embodiments of the present disclosure.

Referring to FIG. 8, in some embodiments, the propulsion system 20 may include a variable speed drive (VSD) 110 operably connecting (e.g., coupling) the rotational assembly 74 of each of the turbocompressors 58, 58A, 58B to the gearbox 34 (e.g., the gear assembly 46). The VSD 110 may be configured, for example, as a hydrostatic transmission, however, the present disclosure is not limited to any particular configuration of the VSD 110. During some operational conditions of the propulsion system 20, an output power of the rotational assembly 74 of one, more than one, or each of the turbocompressors 58 may be greater than work required by a respective compressor 62 to compress ambient air for the engine 32. Accordingly, the VSD 110 may selectively apply at least some rotational force from the rotational assembly 74 of one, more than one, or each of the turbocompressors 58 to the propulsor 1002 (e.g., through the gearbox 34). In other words, output power of the rotational assembly 74 of one, more than one, or each of the turbocompressors 58 may be variably extracted by the VSD 110 and applied for driving rotation of the propulsor 1002 (e.g., in combination with the engine 32), thereby reducing engine 32 loading (e.g., fuel use) while maintaining the desired rotational assembly 74 and propulsor 1002 rotation speeds. As a result, the electrical assembly 30 of the propulsion system 20 of FIG. 8 may not include the electric motor 98 operably connected (e.g., coupled) to the propulsor 1002 through the gearbox 34 (e.g., the gear assembly 46) (see FIGS. 2 and 4-7).

Figure 9A:
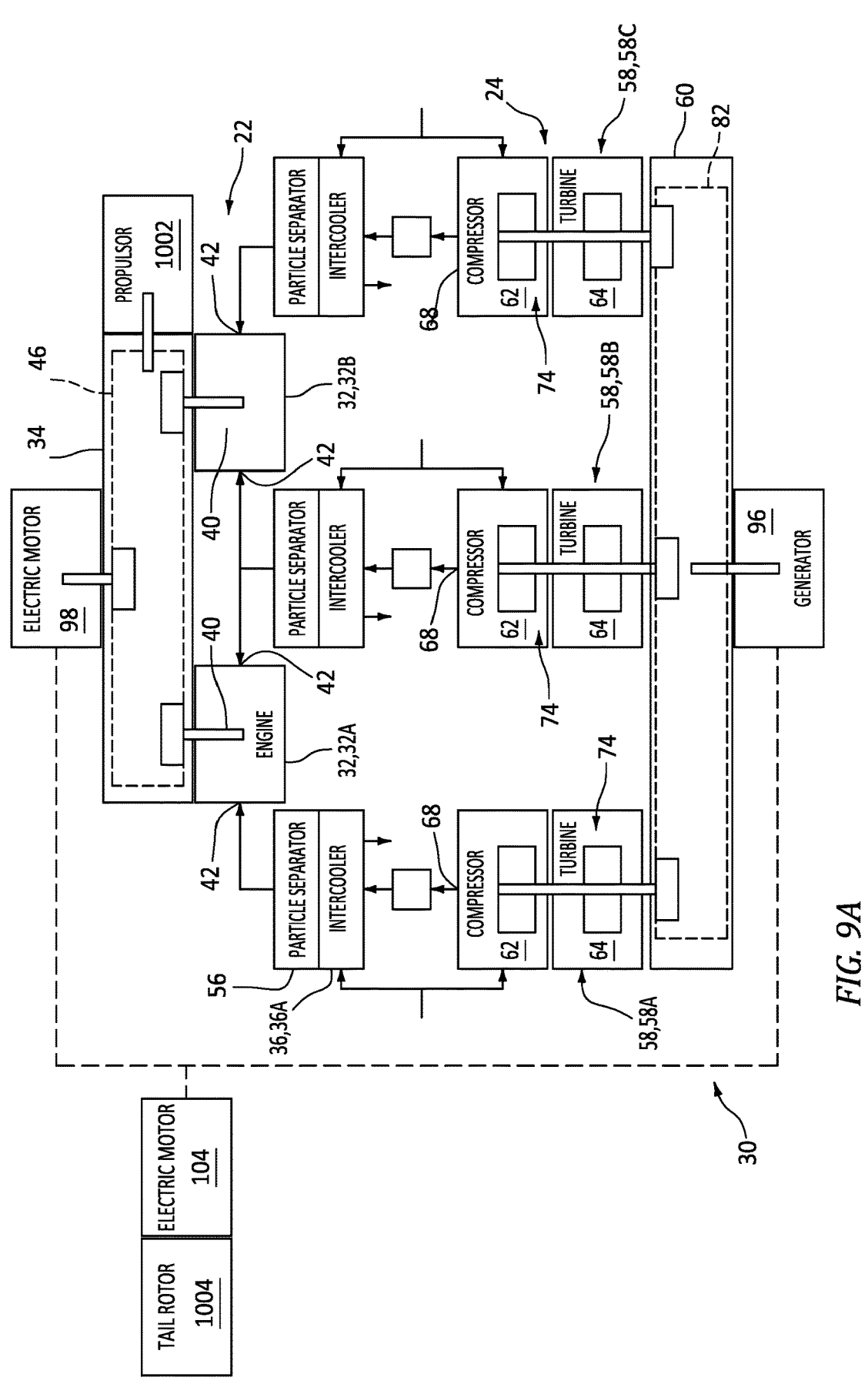
FIGS. 9A-B schematically illustrate portions of another propulsion system for an aircraft, in accordance with one or more embodiments of the present disclosure.
Figure 9B:
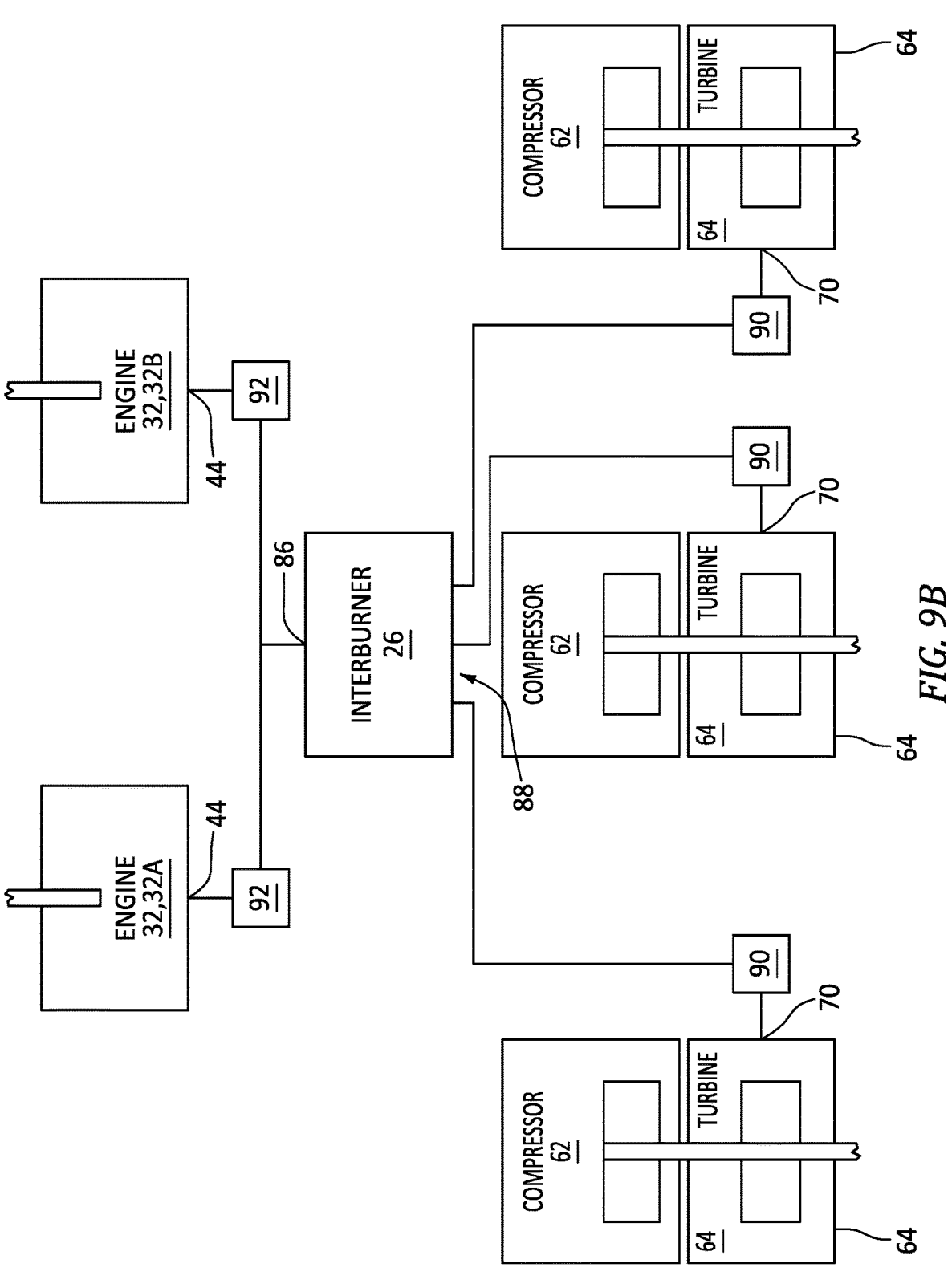

Referring to FIGS. 9A and 9B, in some embodiments, a quantity of the engine 32 for the engine assembly 22 and/or the turbocompressors 58 for the turbocompressor assembly 24 may be increased (e.g., relative to the propulsion system 20 of FIGS. 2 and 4-7) to facilitate additional power and redundancy of the propulsion system 20 at the expense of additional weight and/or complexity. As shown in FIGS. 9A and 9B, for example, the engine assembly 22 may include two engines 32 (engine 32A and engine 32B) and the turbocompressor assembly may include three turbocompressors 58 (e.g., turbocompressor 58A, turbocompressor 58B, and turbocompressor 58C). The interconnections of the interburner 26 with the engines 32, 32A, 32B and with the turbocompressors 58, 58A-C are omitted in FIG. 9A for clarity. These interconnections of the interburner 26 with the engines 32, 32A, 32B and with the turbocompressors 58, 58A-C are separately schematically illustrated in FIG. 9B.

As shown in FIG. 9A, each of the turbocompressors 58, 58A-C (e.g., the compressor 62 at the outlet 68) may be connected in fluid communication with one or both of the engines 32, 32A, 32B (e.g., the air inlet 42) to direct compressed air to the engines 32, 32A, 32B. Each of the engines 32 32A, 32B (e.g., the engine output shaft 40) may be operably connected (e.g., coupled) to the gearbox 34 (e.g., the gear assembly 46) to drive rotation of the propulsor 1002. The rotational assembly 74 for each of the turbocompressors 58, 58A-C may be operably connected (e.g., coupled) to the gearbox 60 (e.g., the gear assembly 82) to drive rotation of the electric generator 96. As shown in FIG. 9B, each of the engines 32, 32A, 32B (e.g., the exhaust outlet 44) may be connected in fluid communication with the interburner 26 (e.g., the inlet 86), for example, by the engine exhaust diverter subassembly 92. The interburner 26 (e.g., the outlet 88) may be connected in fluid communication with the turbine 64 (e.g., the inlet 70) for each of the turbocompressors 58, 58A-C, for example, by the control valve 90. In some embodiments, the electrical assembly 30 of the propulsion system 20 of FIGS. 9A and 9B may not include the energy storage device 102 (e.g., the supercapacitor) as a result of the increased redundancy facilitated by the propulsion system 20 of FIGS. 9A and 9B.

Figure 10:
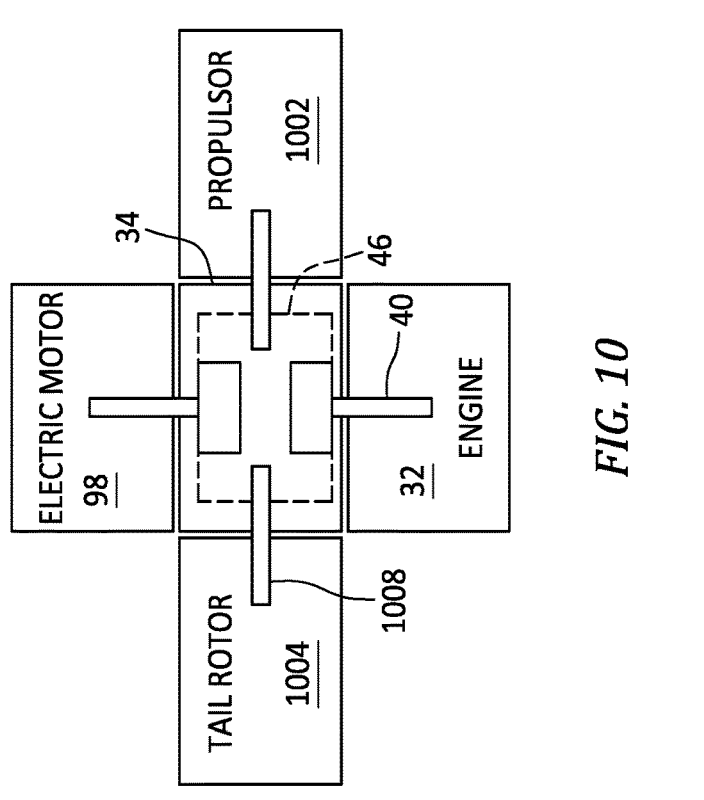
FIG. 10 schematically illustrates a portion of another propulsion system for an aircraft, in accordance with one or more embodiments of the present disclosure.

Referring to FIG. 10, in some embodiments, the tail rotor 1004 (e.g., an input shaft 1008 of the tail rotor 1004) may be operably connected (e.g., coupled) to the gearbox 34 (e.g., the gear assembly 46). The engine 32 (e.g., the engine output shaft 40) and/or the electric motor 98 may drive rotation of the tail rotor 1004 through the gearbox 34. As a result, the electrical assembly 30 of the propulsion system 20 of FIG. 10 may not include the electric motor 104 (see FIGS. 2 and 4-7).

Figure 11:
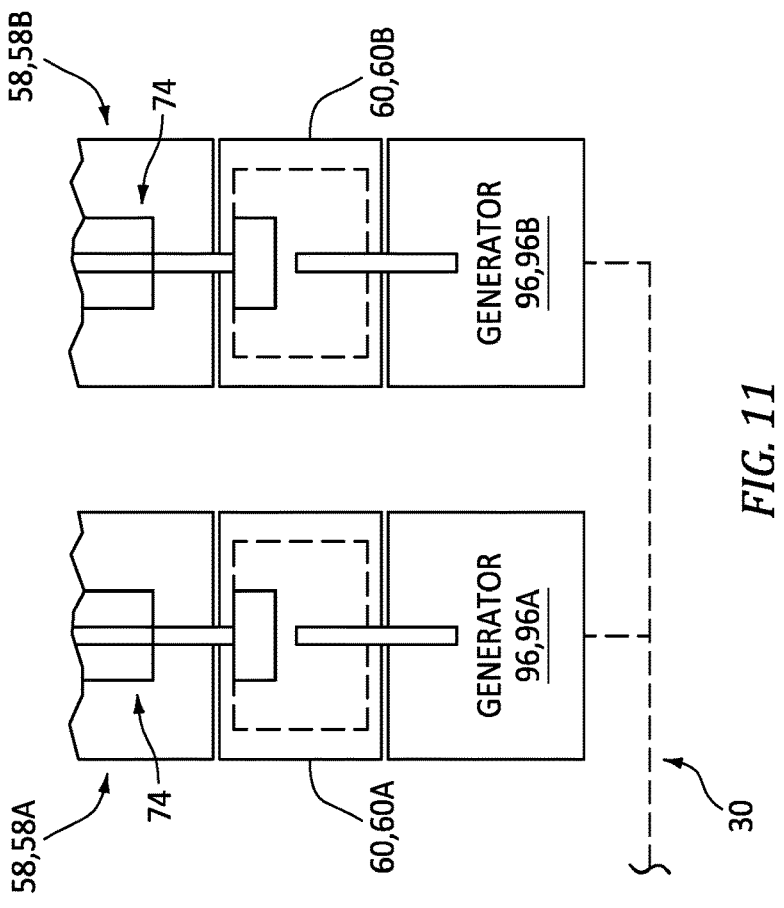
FIG. 11 schematically illustrates a portion of another propulsion system for an aircraft, in accordance with one or more embodiments of the present disclosure.

Referring to FIG. 11, in some embodiments, the electrical assembly 30 may include more than one electric generator 96. For example, the electrical assembly 30 may include one of the electric generator 96 (a generator 96A and a generator 96B) for the rotational assembly 74 of each of the turbocompressors 58, 58A, 58B. Each of the electric generators 96, 96A, 96B may be operably connected (e.g., coupled) to a respective one of the gearbox 60 (e.g., a gearbox 60A and a gearbox 60B). In some embodiments, the electrical assembly 30 of the propulsion system 20 of FIG. 11 may not include the energy storage device 102 (e.g., the supercapacitor) as a result of the increased electrical redundancy facilitated by the propulsion system 20 of FIG. 11 (see FIGS. 2 and 4-7).

Figures 12, 13:
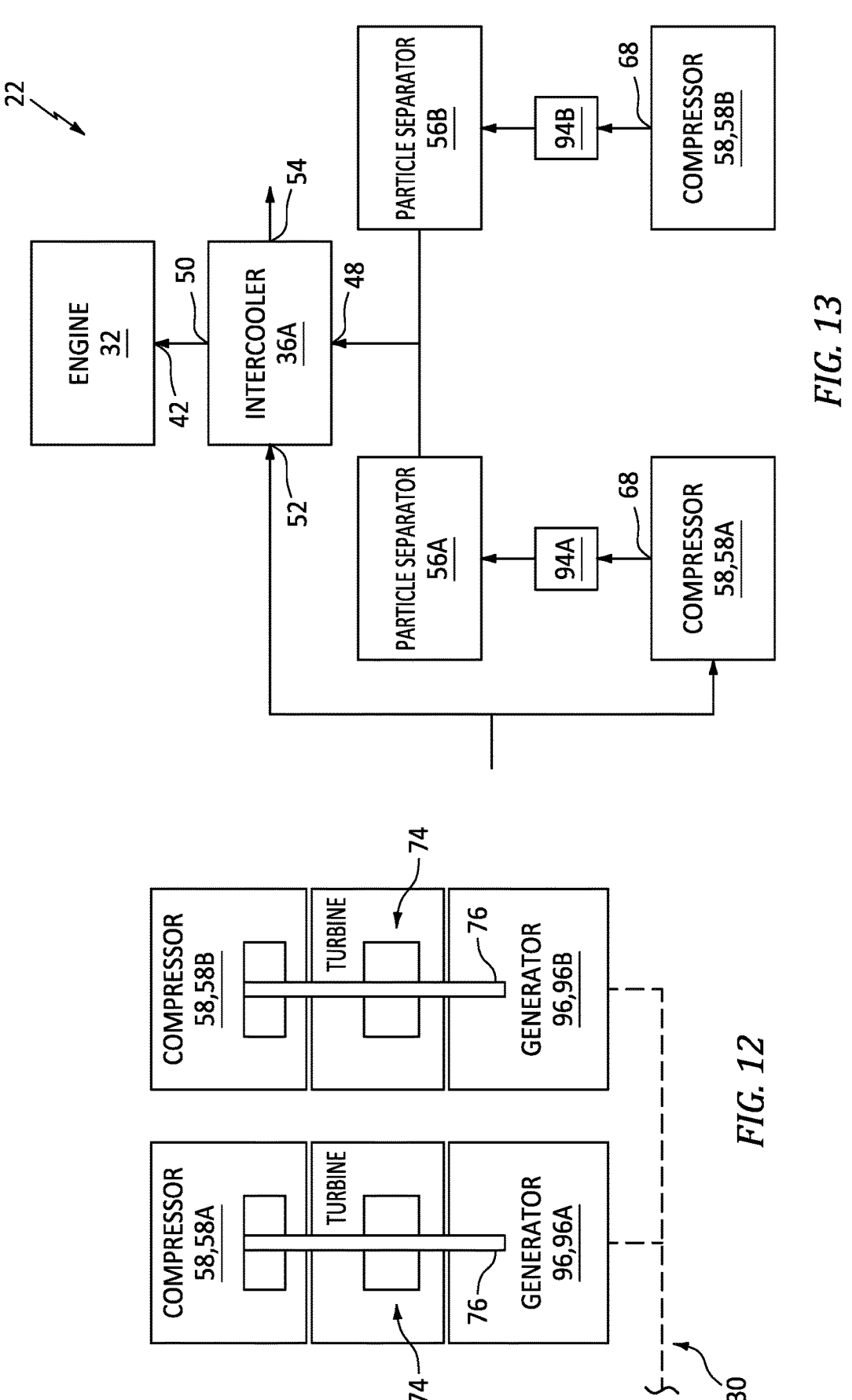
FIG. 12 schematically illustrates a portion of another propulsion system for an aircraft, in accordance with one or more embodiments of the present disclosure.
FIG. 13 schematically illustrates a portion of another propulsion system for an aircraft, in accordance with one or more embodiments of the present disclosure.

Referring to FIG. 12, in some embodiments, the electrical assembly 30 may include more than one electric generator 96, 96A, 9B as discussed above with respect to FIG. 11. Each of the turbocompressor 58, 58A, 58B may be configured as a single module with a respective one of the electric generators 96, 96A, 96B. The rotational assembly 74 (e.g., the shaft 76) of each of the turbocompressors 58, 58A, 58B may be directly coupled with the respective one of the electric generators 96, 96A, 96B. For example, the shaft 76 may drive rotation of the respective one of the generators 96, 96A, 96B at a same rotational speed as the other rotational components of the rotational assembly 74. As a result, the turbocompressor assembly 24 of the propulsion system 20 of FIG. 12 may not include gearbox 60 or the clutches 84. With additional reference to FIG. 6, in a failed turbocompressor operating mode (e.g., described for an identified failure of the turbocompressor 58B) and/or a failed generator operating mode (e.g., described for an identified failure of the electric generator 96B) of the propulsion system 20 of FIG. 12, the intercooler 36B (e.g., the first inlet 48) may be isolated from the compressor 62 (e.g., the outlet 68) for the turbocompressor 58B by a respective one of the compressor outlet diverter subassemblies 94 in the closed condition. The interburner 26 (e.g., the outlet 88) may be isolated from the turbine 64 (e.g., the inlet 70) for the turbocompressor 58B by the control valve 90 in the closed position. The configuration of the turbocompressors 58, 58A, 58B and the electrical generators 96, 96A, 96B of the propulsion system 20 of FIG. 12 facilitates reduced mechanical complexity of the propulsion system 20 as well as simplified operation and installation of the turbocompressor 58 and electric generator 96 modules.

Referring to FIG. 13, in some embodiments, the engine assembly 22 may include one intercooler 36A. The first inlet 48 of the intercooler 36A of FIG. 13 is connected in fluid communication (e.g., using any suitable conduit, pipe, tube, hose, etc.) with the outlet 68 of the compressor 62 of each of the turbocompressors 58, 58A, 58B. For example, the outlet 68 of the compressor 62 of the turbocompressor 58A may be connected in fluid communication with the first inlet 48 by one of the compressor outlet diverter subassemblies 94A and the outlet 68 of the compressor 62 of the turbocompressor 58B may be connected in fluid communication with the first inlet 48 by one of the compressor outlet diverter subassemblies 94B. The intercooler 36A may include a particle separator 56A, 56B connected in fluid communication between each of the compressor outlet diverter subassemblies 94A, 94B and the first inlet 48. The first outlet 50 is connected in fluid communication with the air inlet 42. The intercooler 36A of FIG. 13 is configured to receive cooling air (e.g., ambient air from an air intake of the aircraft 1000; see FIG. 1) at the second inlet 52 and exhaust this cooling air from the propulsion system 20 through the second outlet 54. The configuration of the intercooler 36A of FIG. 13 may facilitate reduced propulsion system weight provide and alternative packaging configurations of the propulsion system 20 within the aircraft 1000.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:

an engine assembly including an engine, the engine including an air inlet, an exhaust outlet, and an engine output shaft, the engine output shaft is configured to be operably connected to a propulsor of the aircraft, and the engine is configured to drive rotation of the propulsor with the engine output shaft;

an interburner including an interburner inlet and an interburner outlet, the interburner is configured to mix and burn a gas from the interburner inlet with fuel to form a combustion gas;

a turbocompressor assembly including at least one turbocompressor, the at least one turbocompressor including a turbine and a compressor, the turbine including a turbine inlet and a turbine outlet, the compressor including a compressor inlet and a compressor outlet, the turbine and the compressor forming a rotational assembly, the rotational assembly including a shaft, a bladed turbine rotor of the turbine, and a bladed compressor rotor of the compressor, the shaft interconnecting the bladed turbine rotor and the bladed compressor rotor; and a flow control assembly including an engine exhaust diverter subassembly and at least one compressor outlet diverter subassembly, the engine exhaust diverter subassembly connected in fluid communication with and between the exhaust outlet, the interburner inlet, and the turbine inlet, the engine exhaust diverter subassembly selectively configurable in a first condition, a second condition, and a closed condition:

in the first condition, the engine exhaust diverter subassembly connecting the exhaust outlet in fluid communication with the interburner inlet, in the second condition, the engine exhaust diverter subassembly connecting the exhaust outlet in fluid communication with the turbine inlet, and in the closed condition, the engine exhaust diverter subassembly isolating the exhaust outlet from the interburner inlet and the turbine inlet, and the at least one compressor outlet diverter subassembly connected in fluid communication with and between the compressor outlet, the air inlet, and the interburner inlet.

2. The propulsion system of claim 1, wherein the at least one compressor outlet diverter subassembly is selectively configurable in a first condition, a second condition, and a closed condition:

in the first condition, the at least one compressor outlet diverter subassembly connects the compressor outlet in fluid communication with the air inlet, in the second condition, the at least one compressor outlet diverter subassembly connects the compressor outlet in fluid communication with the interburner inlet, and in the closed condition, the at least one compressor outlet diverter subassembly isolates the compressor outlet from the air inlet and the interburner inlet.

3. The propulsion system of claim 1, wherein the engine assembly further includes an intercooler, the intercooler is connected in fluid communication with and between the at least one compressor outlet diverter subassembly and the air inlet.

4. The propulsion system of claim 3, wherein the intercooler includes a particle separator.

5. The propulsion system of claim 1, further comprising an electrical assembly including at least one electric generator, and the at least one electric generator is operably connected to the rotational assembly of one or more turbocompressors of the at least one turbocompressor.

6. The propulsion system of claim 5, wherein the turbocompressor assembly further includes a first gearbox, and the first gearbox is operably connected to and between the at least one generator and the rotational assembly of the one or more turbocompressors of the at least one turbocompressor.

7. The propulsion system of claim 6, wherein the engine assembly further includes a second gearbox, the electrical assembly includes a first electric motor electrically connected to the at least one electric generator, and the engine output shaft and the first electric motor are operably connected to the second gearbox.

8. The propulsion system of claim 7, wherein the electrical assembly further includes an energy storage device electrically connected to the at least one electric generator and the first electric motor.

9. The propulsion system of claim 7, wherein the engine output shaft is operably connected to the second gearbox by a one-way clutch.

10. The propulsion system of claim 1, wherein:
the at least one turbocompressor includes a first turbo-compressor and a second turbocompressor;
the at least one compressor outlet diverter subassembly includes a first compressor outlet diverter subassembly and a second compressor outlet diverter subassembly;
the first compressor outlet diverter subassembly is connected in fluid communication with and between the compressor outlet of the compressor of the first turbocompressor, the air inlet, and the interburner inlet; and
the second compressor outlet diverter subassembly is connected in fluid communication with and between the compressor outlet of the compressor of the second turbocompressor, the air inlet, and the interburner inlet.

11. The propulsion system of claim 10, further comprising an electrical assembly including a first electric generator and a second electric generator, wherein the first electric generator is operably connected to the rotational assembly of the first turbocompressor and the second electric generator is operably connected to the rotational assembly of the second turbocompressor.

12. The propulsion system of claim 1, wherein the engine is an intermittent combustion engine.

13. A propulsion system for an aircraft, the propulsion system comprising:
an engine assembly including an engine, the engine including an air inlet, an exhaust outlet, and an engine output shaft, the engine output shaft is configured to be operably connected to a propulsor of the aircraft, and the engine is configured to drive rotation of the propulsor with the engine output shaft;
an interburner including an interburner inlet and an interburner outlet, the interburner is configured to mix and burn a gas from the interburner inlet with fuel to form a combustion gas;
a turbocompressor assembly including at least one turbocompressor, the at least one turbocompressor including a turbine and a compressor, the turbine including a turbine inlet and a turbine outlet, the compressor including a compressor inlet and a compressor outlet, the turbine and the compressor forming a rotational assembly, the rotational assembly including a shaft, a bladed turbine rotor of the turbine, and a bladed compressor rotor of the compressor, the shaft interconnecting the bladed turbine rotor and the bladed compressor rotor; and
a flow control assembly including an engine exhaust diverter subassembly and at least one compressor outlet diverter subassembly,
the engine exhaust diverter subassembly connected in fluid communication with and between the exhaust outlet, the interburner inlet, and the turbine inlet, and
the at least one compressor outlet diverter subassembly connected in fluid communication with and between the compressor outlet, the air inlet, and the interburner inlet, the at least one compressor outlet diverter subassembly selectively configurable in a first condition, a second condition, and a closed condition:
in the first condition, the at least one compressor outlet diverter subassembly connecting the compressor outlet in fluid communication with the air inlet,
in the second condition, the at least one compressor outlet diverter subassembly connecting the compressor outlet in fluid communication with the interburner inlet, and in the closed condition, the at least one compressor outlet diverter subassembly isolating the compressor outlet from the air inlet and the interburner inlet.

14. The propulsion system of claim 13, wherein the engine assembly further includes an intercooler, the intercooler is connected in fluid communication with and between the at least one compressor outlet diverter subassembly and the air inlet.

15. The propulsion system of claim 13, further comprising an electrical assembly including at least one electric generator, and the at least one electric generator is operably connected to the rotational assembly of one or more turbocompressors of the at least one turbocompressor.

16. The propulsion system of claim 15, wherein the turbocompressor assembly further includes a first gearbox, and the first gearbox is operably connected to and between the at least one generator and the rotational assembly of the one or more turbocompressors of the at least one turbocompressor.

17. The propulsion system of claim 16, wherein the engine assembly further includes a second gearbox, the electrical assembly includes a first electric motor electrically connected to the at least one electric generator, and the engine output shaft and the first electric motor are operably connected to the second gearbox.

18. The propulsion system of claim 17, wherein the electrical assembly further includes an energy storage device electrically connected to the at least one electric generator and the first electric motor.

19. The propulsion system of claim 17, wherein the engine output shaft is operably connected to the second gearbox by a one-way clutch.

20. A propulsion system for an aircraft, the propulsion system comprising:
an engine assembly including an engine, the engine including an air inlet, an exhaust outlet, and an engine output shaft, the engine output shaft is configured to be operably connected to a propulsor of the aircraft, and the engine is configured to drive rotation of the propulsor with the engine output shaft;
an interburner including an interburner inlet and an interburner outlet, the interburner is configured to mix and burn a gas from the interburner inlet with fuel to form a combustion gas;
a turbocompressor assembly including at least one turbocompressor, the at least one turbocompressor including a turbine and a compressor, the turbine including a turbine inlet and a turbine outlet, the compressor including a compressor inlet and a compressor outlet, the turbine and the compressor forming a rotational assembly, the rotational assembly including a shaft, a bladed turbine rotor of the turbine, and a bladed compressor rotor of the compressor, the shaft interconnecting the bladed turbine rotor and the bladed compressor rotor, the at least one turbocompressor including a first turbocompressor and a second turbocompressor; and
a flow control assembly including an engine exhaust diverter subassembly and at least one compressor outlet diverter subassembly,
the engine exhaust diverter subassembly connected in fluid communication with and between the exhaust outlet, the interburner inlet, and the turbine inlet, and
the at least one compressor outlet diverter subassembly including a first compressor outlet diverter subassembly and a second compressor outlet diverter subassembly, the first compressor outlet diverter subassembly connected in fluid communication with and between the compressor outlet of the first turbocompressor, the air inlet, and the interburner inlet, the second compressor outlet diverter subassembly connected in fluid communication with and between the compressor outlet of the second turbocompressor, the air inlet, and the interburner inlet.

* * * * *